United States Patent
Hussein et al.

(10) Patent No.: US 6,563,906 B2
(45) Date of Patent: May 13, 2003

(54) X-RAY COMPTON SCATTERING DENSITY MEASUREMENT AT A POINT WITHIN AN OBJECT

(75) Inventors: Esam Hussein, Fredericton (CA); Balza Achmad, Yogyakarta (ID)

(73) Assignee: University of New Brunswick, Fredericton (CA)

( * ) Notice: Subject to any disclaimer, the term of this patent is extended or adjusted under 35 U.S.C. 154(b) by 0 days.

(21) Appl. No.: 09/933,906

(22) Filed: Aug. 22, 2001

(65) Prior Publication Data

US 2002/0044628 A1 Apr. 18, 2002

Related U.S. Application Data

(60) Provisional application No. 60/228,085, filed on Aug. 28, 2000.

(51) Int. Cl.[7] .............................................. G01B 15/02
(52) U.S. Cl. .......................................... 378/89; 378/86
(58) Field of Search ................................. 378/89, 90, 86

(56) References Cited

U.S. PATENT DOCUMENTS

| | | | |
|---|---|---|---|
| 3,809,904 A | 5/1974 | Clarke et al. | 250/358 |
| 4,123,654 A | 10/1978 | Reiss et al. | 250/272 |
| 4,228,351 A | 10/1980 | Snow et al. | 250/273 |
| 4,768,214 A | 8/1988 | Bjorkholm | 378/87 |
| 4,850,002 A | 7/1989 | Harding et al. | 378/87 |
| 4,887,285 A | 12/1989 | Harding et al. | 378/88 |
| 4,956,856 A | 9/1990 | Harding | 378/88 |
| 5,125,017 A | 6/1992 | Lempriere | 378/86 |
| 5,150,395 A | 9/1992 | Kosanetzky et al. | 378/86 |
| 5,247,560 A | 9/1993 | Hosokawa et al. | 378/54 |
| 5,247,561 A | 9/1993 | Kotowski | 378/87 |
| 5,696,806 A | 12/1997 | Grodzins et al. | 378/86 |
| 5,729,582 A * | 3/1998 | Ham et al. | 378/89 |
| 5,970,116 A | 10/1999 | Dueholm et al. | 378/90 |
| 6,094,470 A | 7/2000 | Teller | 378/54 |

FOREIGN PATENT DOCUMENTS

| | | |
|---|---|---|
| CA | 1101133 | 5/1981 |
| CA | 1135878 | 11/1982 |
| CA | 1157968 | 11/1983 |
| JP | 0201341 | 9/1987 |

OTHER PUBLICATIONS

Bray, D.E., McBride, D. "Nondestructive Testing Techniques", Willey–interscience Publication, New York, 1992.

Hussein, E.M.A., "Compton Scatter Imaging Systems", in *Bioinstrumentation: Research, Development, and Applications*, Wise, D.L., Ed., Butterworths Publ., Storeham, MA., Chapter 35, pp. 1053–1086, 1990.

Näringsliv/Samhälle, Linköpings Universitet, "Mathematics and Physics of Emerging Biomedical Imaging", pp. 89–120, 1998.

Shung, K.K., Smith, B.M., Tsui, B., "Principles of Medical Imaging", Academic Press, Inc., San Diego, 1992.

(List continued on next page.)

*Primary Examiner*—Craig E. Church
(74) *Attorney, Agent, or Firm*—Mario Theriault (57) ABSTRACT

The present invention pertains to a non-rotating method for non-intrusively determining the density of a point embedded within an object, without necessarily obtaining a full image for the entire object. The method consists of passing a X-ray beam through a point within an object and measuring Compton scatterings from the point from a first and second energy bands within the energy spectrum of the X-ray beam, along a first and second angles from the X-ray beam. Using the kinetics of Compton scattering at a specific angle, four equations are formulated with four measurements and four unknowns; the radiation attenuation factor along the object between the X-ray source and the point, the radiation attenuation factor between the point and each of the detectors and the density of the object at the point. The four equations are solved simultaneously to determined the four unknowns. There is also provided a matrix inversion process to facilitate the solution of the equations.

21 Claims, 6 Drawing Sheets

OTHER PUBLICATIONS

Mathias, R., "The Basic of Brain Imaging", *NIDA Notes*, vol. 11, No. 5, 1996.

Brown, D.R., Gozani, T., "Nuclear Imaging Technologies", *SAIC Science and Technology Trends*, pp. 9–16, 1999.

Whynot, T.M., "Compton Scattering Nondestructive Inspection of Concrete Structures", M.Sc.E. Thesis, University of New Brunswick, 1988.

Knoll. G.F., "Radiation Detection and Measurement", John Wiley & Sons, Inc., New York, 1979.

Lale, P.G., "The Examination of Internal Tissues by High–Energy Scattered X Radiation", *Radiology*, 90, pp. 510–517, 1968.

Al–Bahri, J.S., Spyrou, N.M, "Electron Density of Normal and Pathological Breast Tissues using a Compton Scattering Technique", *Appl. Radiat. Isot.*, vol. 49, No. 12, pp. 1677–1684, 1998.

Clarke, R.L., Van Dyk, G., "A New Method for Measurement of Bone Maineral Content using both Transmitted and Scattered Beams of Gamma–rays", *Phys. Med. Biol.*, vol. 18, No. 4, pp. 532–539, 1973.

Kaufman, L., Gamsu, G., Savoca, C., Swann, S., Murphey, L., Hruska, B., Palmer, D., Ullman, J., "Measurement of Absolute lung Density by Compton–Scatter Densitometry", *IEEE Transactions on Nuclear Science*, vol. NS–23, No. 1, pp. 599–605, 1976.

Huddleston, A.L., Bhaduri, D., "Compton Scatter Densitometry in Cancellous Bone", *Phys. Med. Biol.*, vol. 24, No. 2, pp. 310–318, 1979.

Huddleston, A.L., Sackler, J.P., "The Determination of Electron Density by the Dual–Energy Compton–Scatter Method", *Med. Phys.*, vol. 12, No. 1, pp. 13–19, 1985.

Hussein, E.M.A., Meneley, D.A., "On the Solution of the Inverse Problem of Radiation Scattering Imaging", *Nuclear Science and Engineering*, 92, pp. 341–349, 1986.

Balogun, F.A., Spyrou, N.M., "Compton Scattering Tomography in the Study of a Dense Inclusion in a Lighter Matrix", *Nuclear Instrumentation and Methods in Physics Research*, B83, pp. 533–538, 1993.

Arendtsz, N.V., Hussein, E.M.A., "Energy–Spectral Compton Scatter Imaging Part II: Experiments", *IEEE Trans. Nucl. Sci.*, 1995.

Zhu, P., Peix, G., Babot, D., Muller, J., "In–line Density Measurement System using X–ray Compton Scattering", *NDT& E International*, vol. 28, No. 1, pp. 3–7, 1995.

Arendtsz, N.V., "Compton Scatter Tomography with Wide Field–of–View Energy–Discriminating Detectors", Ph.D. Thesis, University of New Brunswick, 1995.

Briesmeister, J.F., MCNP—A General Monte Carlo N–Particle Transport Code Version 4B Manual, 1997.

Busono, P., "Combined transmission and Scattering X–ray Tomography", Ph.D. Thesis, University of New Brunswick, 1998.

Alvarez, R.E., Macovski, a., "Energy–selective Reconstructions in X–ray Computerized Tomography", *Phys. Med. Biol.*, vol. 21, No. 5, pp. 733–744, 1976.

Evans, R.D., "The Atomic Nucleus", McGraw Hill Book Company, New York, 1955.

Guzzardi R., Mey, M., Giuntini, C., "90° Compton Scattering Tomography of the Lung: detection Characteristics and Correction of the Attenuation", *The Journal of Nuclear Medicine and Allied Sciences*, vol. 24, No. 3–4, pp. 163–169, 1980.

Towe, C.B., Jacobs, A.M., "X–ray Backscatter Imaging", *IEEE Transactions on Biomedical Engineering*, vol. BME–28, No. 9, pp. 646–654, 1981.

Holt, R.S., "Compton Imaging", *Endeavor, New Series*, vol. 9, No. 2, pp. 97–105, 1985.

Morgan, H.M., Shakesshaft, T., Lillicrap, S.C., "Gamma–ray Backscatter for Body Composition Measurement", *Appl. Radiat. Isot.*, vol. 49, No. 5/6, pp. 55–557, 1998.

Mullin, S.K., Hussein, E.M.A., "A Compton–Scatter Spectrometry Technique for Flaw Detection", *Nuclear instrumentation and Methods in Physics Research*, A 353, pp. 663–667, 1994.

* cited by examiner (PRIOR ART)

X-RAY COMPTON SCATTERING DENSITY MEASUREMENT AT A POINT WITHIN AN OBJECT

This application claims the benefit of Provisional application Ser. No. 60/228,085, filed Aug. 28, 2000.

This invention was made with Government support under Research Grant # 97-G-029 awarded by the Federal Aviation Administration. The Government has certain rights in this invention.

FIELD OF THE INVENTION

This invention relates to density measurement using Compton scattering of X-rays for determining density at a point within an object without exposing the entire object to radiations. This invention also pertains to formulating an algorithm for solving density-measurement equations.

BACKGROUND OF THE INVENTION

In nondestructive evaluation, it is often needed to know the density at a point, or points, in a region of interest within an object. Point-density measurement is useful, for instance, to detect a flaw in an isolated over-stressed region of a component. In another example, when a suspect material is identified by radiography, point-by-point imaging can be used to determine the density of the suspect material without having to generate a point-by-point density image of the entire object. This can be useful, for example, in the detection of explosives and other contraband materials in passenger luggage. In medical applications, point-by-point imaging can be useful in follow-up examination to determine, for instance, whether treatment was effective in destroying an isolated tumor.

Measuring density at an isolated point within an object using a X-ray beam requires the beam to reach the point of interest, to pass through the point of interest and to reach a detector. In its way to the point of interest, the beam is modified as it transverses other points, unless the point of interest is at the surface of the object. The beam is modified again by the point of interest. The beam is further affected by other points as it travels out of the object toward the detector. For this reason, basically, conventional transmission radiographic imaging is not suited for obtaining the density at a point within an object, since radiography provides an integrated line density along the path of the radiation beam penetrating the object. To determine the density at a point, many multiple radiation exposures at different angles or different directions must be effected, with subsequent numerical image reconstruction. This process is often referred to as computed tomography. Such a complete imaging process is tedious and expensive. It involves numerous consecutive measurements using many measuring devices and complex reconstruction algorithms to generate the image.

Examples of related prior art using radiographic imaging processes are described in the following patent documents:

U.S. Pat. No. 3,809,904 issued on May 7, 1974 to Clarke et al.;
U.S. Pat. No. 4,123,654 issued on Oct. 31, 1978 to Reiss et al.;
U.S. Pat. No. 4,228,351 issued on Oct. 14, 1980 to Snow et al.;
U.S. Pat. No. 4,768,214 issued on Aug. 30, 1988 to P. J. Bjorkholm;
U.S. Pat. No. 4,850,002 issued on Jul. 18, 1989 to Harding et al.;
U.S. Pat. No. 4,887,285 issued on Dec. 12, 1989 to Harding et al.;
U.S. Pat. No. 5,247,560 issued on Sept. 21, 1993 to Hosokama et al.;
U.S. Pat. No. 5,247,561 issued on Sept. 21, 1993 to A. F. Kotowski;
U.S. Pat. No. 5,696,806 issued on Dec. 9, 1997 to Grodzins et al.;
CA 1,101,133 issued on May 12,1981 to G. Harding;
CA 1,135,878 issued on Nov. 16, 1982 to Jatteau et al.;
CA 1,157,968 issued on Nov. 29, 1983 to Harding et al.

In the methods of the prior art, the attenuation of the radiation along the path of the X-ray beam is in most cases estimated, extrapolated from previous measurements or considered as a constant. It is believed that these estimations and extrapolations could lead to measurement inaccuracies, and for this reason, basically, it is believed that the prior art methods have only been used with limited degrees of success. As such, it may be appreciated that there continues to be a need for a method to determine with precision the density at a point, or points in a region of interest within an object, without performing a complete imaging of the object.

Before describing the present invention, however, it is deemed that certain general information should be reminded in order to afford a clearer understanding of the following specification. In particular, a general knowledge of the Compton scattering principle applicable to a X-ray beam is believed essential to facilitate the understanding of the present invention.

Compton scattering is the incoherent collision between photons and the free electrons of the atoms and it dominates all other photon interactions. Since Compton scattering is an interaction with the electrons of the atom, its probability of interaction depends on the density of the medium. Therefore, Compton scattering principle is available for non-destructive measurement of density.

Figure 1:
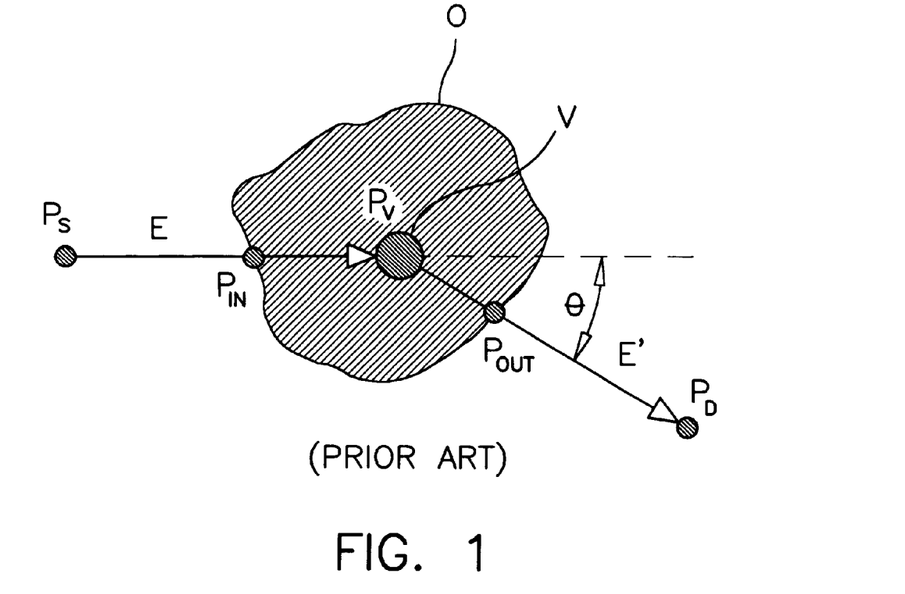
FIG. 1 illustrates Compton scattering.

In order to demonstrate how Compton scattering principle can be used to measure the density at a point within an object, reference is firstly made to FIG. 1 where a source of X-ray having an energy E is placed at point $P_s$ and is directed at a small voxel V located at point $P_v$ within an object O. A detector is placed at point $P_d$ to determine the electron density of the voxel 'V'. In order for the detector at point $P_d$ to monitor the scattered radiation E' from point $P_v$ it must be collimated so that it focuses along the direction $P_v$–$P_d$. The unique relationship between the scattered photon energy E', and the scattering angle θ is expressed as follows:

$$E' = E/(1+((E/m_oc^2)(1-\cos\theta))) \qquad (1)$$

where E is the initial energy of the incident photon, and $m_oc^2$ is the rest mass of the electron (511 keV). With the detector field-of-view focused on the scatter line along $P_v$–$P_d$ and the source collimated along the direction of $P_s$–$P_v$, the electron density, $\rho^e_v$ at $P_v$ can be related to the detector response, S(E,θ) as follows:

$$S(E,\theta) = k(E,\theta) f_i \rho^e_v f_s \qquad (2)$$

where $f_i$ and $f_s$ are attenuation factors which account for the decrease in photon intensity as radiation travels toward and away from the scattering point, that is between the points $P_{in}$–$P_v$ and between the points $P_v$–$P_{out}$ respectivelly. k(E,θ) is a system constant that can be expressed, for a well-collimated source, as $$k(E,\theta) = S_o D\sigma(E)(p(\cos\theta)/2\pi R^2)\eta(E') \qquad (3)$$

where $S_0$ is the source strength per unit area, D is voxel width, σ(E) is the probability of scattering per unit area per electron (called microscopic scattering cross section) at energy E, p(cos θ) is the probability of a photon scattered at a specific angle θ, R is the distance from the scattering point to the detector, and η(E') is the detector efficiency at energy E'.

The incident and scattering attenuation factors ($f_i$ and $f_s$) can be expressed as $$f_i = \exp\left[-\int_{Pin}^{Pr} \mu_t(r, E) dr\right] \quad (4)$$

$$= \exp\left[-\int_{Pin}^{Pv} \sigma_t(r, E) \rho^e(r) dr\right]$$

and $$f_s = \exp\left[-\int_{Pv}^{Pout} \mu_t(r', E') dr'\right] \quad (5)$$

$$= \exp\left[-\int_{Pv}^{Pout} \sigma_t(r', E') \rho^e(r') dr'\right]$$

where $\mu_t(r,E)$ is the linear attenuation coefficient of photon of energy E at point (r), $\rho^e(r)$ is the electron density at point (r) along the beam path, and $\sigma_t(r,E)$ is the total attenuation cross-section of photon of energy E per unit electron density by the material at point (r).

It will be appreciated that in order to calculate the electron density from the detector response, S(E,θ), as shown in equation (2), the attenuation factors, $f_i$ and $f_s$ must be determined. This has created problems in the past, since the values of these factors depend on the density of the material present in the path of the radiation beam, which are not usually known. Consequently, the formulation of the problem has been impracticable in the past because of the three unknowns in a single equation.

SUMMARY OF THE INVENTION

In the present invention, however, there is provided a method for determining with accuracy the density at a point within a region of interest in an object. This method is effected by generating and solving a set of fully-determined density-measurement equations.

Broadly, the method according to the present invention uses a X-ray beam having a relatively wide energy spectrum. Two source energy bands are selected within this source energy spectrum. Simultaneous measurements of the radiation transmitted and/or scattered are effected, at two distinct detected energy bands within the corresponding transmitted and/or scattered energy spectrums. The detected energy bands are calculated according to the unique relationship between the source energy bands and Compton scattering at a specific angle.

The source energy bands are selected in the energy range where Compton scattering dominates, and where the attenuation coefficient is directly proportional to density. This relation is used to reduce the attenuation factors at the two source energy bands to a single unknown as a function of energy and density.

Therefore, the main problem unknowns are; the attenuation factor along the incident beam and the density of the material of the object at the point within the region of interest. Each measurement adds with it one unknown, that is the attenuation factor along the path of the scattered or transmitted radiation. With the two main unknowns and each measurement adding with it one extra unknown, a system having N detectors yields 2+N unknowns. Keeping in mind that each detector provides two measurements, the number of measurements is 2N for N detectors. It will be appreciated that only two detectors are required to formulate a fully determined problem. A set of four equations, for example, using the radiation measurements of two detectors from the two source energy bands is sufficient to determine the attenuation of the radiation from the X-ray source to the point of interest, the attenuation of the radiation from the point of interest to each of the detectors and the density of the material of the object at the point of interest. Additional detectors or additional source energy bands can be used to over-determine the problem, and hence to increase the precision of the measurements.

This method is advantageous principally for allowing the measurement of the density at a point within an object without rotating the X-ray source, without rotating the radiation detectors and without rotating the object. The density measurement is effected without extrapolation from the measurements of neighboring voxels. The density measurement is effected with a single X-ray beam in a single exposure. The location of the examined voxel is determined by applying simple trigonometry principles.

It will be appreciated that density measurements can be obtain for a region of interest comprising several juxtaposed voxels within the object by moving the object between the X-ray source and the detectors. And of course, a three-dimensional density map of the entire object can be determined when needed, using point-by-point reconstruction of the object using well known computer-aided-drafting software.

In accordance with another aspect of the present invention, there is provided a best mode for simultaneously solving a set of fully-determined density-measurement equations. This best mode, or algorithm, consists of formulating the point density problem mentioned above into an invertible matrix that incorporates specific conditions, to increase the precision of determined density. The first condition requires that the matrix be a square matrix. Another condition requires that the source energy bands must be distinct from each other and far apart. A third condition requires that the detectors for measuring the scattered radiations be placed between the angles of 30° and 165° from the source X-ray beam, and preferably between 30° and 60° for the first detector and between 120° and 150° for the second detector. Finally, a third detector may be used to over-determine the problem, and this detector may be placed along the incident beam or at a right angle from it.

During experimental work, several sets of fully-determined density-measurement equations were successfully applied into an invertible matrix under the aforesaid conditions and simultaneously solved to determine the density of objects enclosed by other objects with relatively small differences with the actual values, that is below 5% difference.

Other advantages and novel features of the present invention will become apparent from the following detailed description.

BRIEF DESCRIPTION OF THE DRAWINGS

One embodiment of the method for determining density at a point within an object and the preferred algorithm for solving density equations are illustrated in the accompanying drawings, in which like numeral denote like parts throughout the several views, and in which.

DETAILED DESCRIPTION OF THE PREFERRED EMBODIMENT

While this invention is susceptible of embodiments in many different forms, there is shown in the drawings and will be described in details herein a specific embodiment, with the understanding that the present disclosure is to be considered as an example of the principles of the invention and is not intended to limit the invention to the embodiment illustrated and described.

Figure 2:
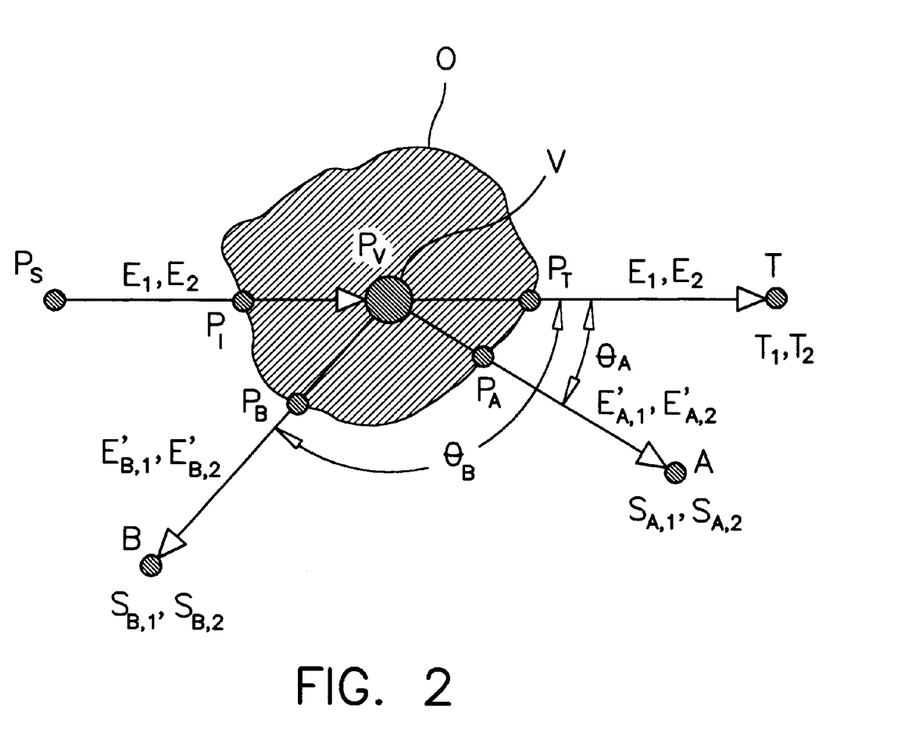
FIG. 2 illustrates the process according to the present invention using two or three detectors selected from two scattering detectors and one transmission detector.
Figure 3:
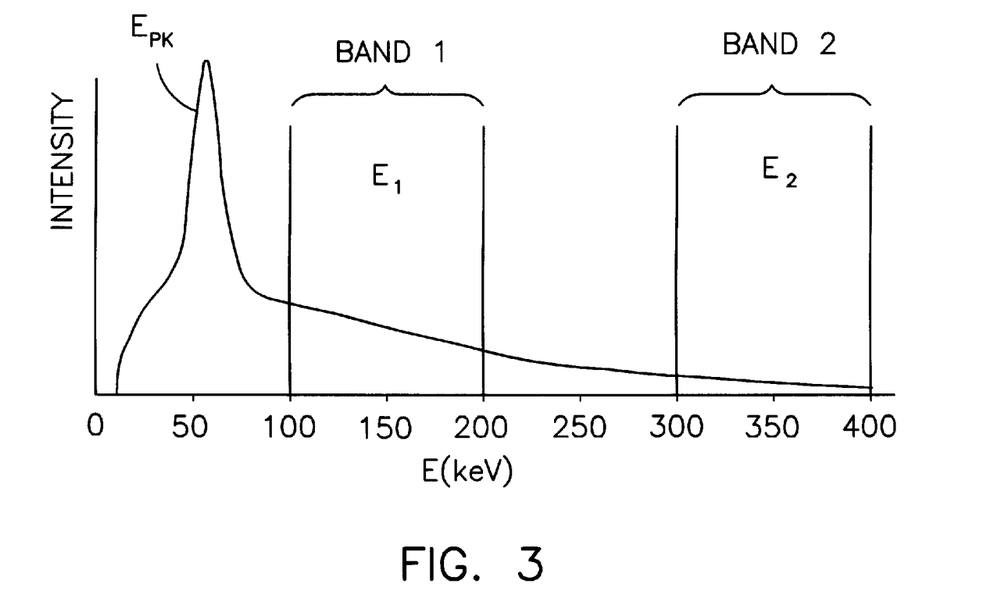
FIG. 3 is a simplified representation of a source energy spectrum and two source energy bands selected along the source energy spectrum.

Generating a set of Fully-Determined Density-Measurement Equations, for Determining the Density at a Point Within an Object Reference is firstly made to FIG. 2. For a same X-ray source at point $P_S$, the energy distribution of the incident photons is divided into separated source energy bands $E_1$, $E_2$, as represented graphically in FIG. 3. The density of the voxel V at point $P_V$, is determined by measuring the radiation transmitted at two source energy bands $E_1$, $E_2$ and/or the radiation scattered at two scattering angles $\theta_A$, $\theta_B$ at two detected energy bands $E'_{A,1}$, $E'_{A,2}$ and $E'_{B,1}$, $E'_{B,2}$ respectively, determined by the kinetics of Compton scattering in equation (1). If the source energy bands $E_1$, $E_2$ are selected in the energy range where Compton scattering dominates, then the attenuation coefficient is directly proportional to density. This enables separation of energy and spatial dependencies since the Compton cross-section per electron, $\sigma(E)$, is a function of energy only. The attenuation coefficient at point x along the source beam and energy E, can therefore be approximated as $$\mu_t(x,E) = \rho^e(x)\sigma(E) \tag{6}$$

where $\rho^e(x)$ is the electron-density at point x. This reduces the attenuation factors at the two source energy bands to a single unknown, since the attenuation coefficients at each energy can be evaluated if the density is known.

Therefore, the main problem unknowns in the configuration of FIG. 2 become; the density at point $P_V$ and the attenuation factor along the incident beam $P_I$–$P_V$. As mentioned before, each additional measurement adds with it one attenuation factor, e.g. for transmission, the attenuation along $P_V$–$P_T$ becomes unknown. With the two main unknowns and with each measurement adding with it one extra unknown, only two detectors are required to give a fully-determined problem where 2+N equal 2N. Any extra additional measurement can be used to over-determine the problem, and hence enable the increase in measurement accuracies.

For the above method to work, the source energy spectrum must be relatively wide, and the selected source energy bands must be very distinct from each other; otherwise the attenuation coefficient at the two source energy bands can be very close to each other leading to redundant measurements. It will be appreciated that there is no reason not to consider more than two source energy bands provided of course that each energy band yields an independent measurement.

Algorithm for Solving Density-Measurement Equations

The problem posed by the arrangement in FIG. 2 is formulated into a matrix form to enable direct inversion and solution. This is facilitated by the formulation of a square matrix, as explained in the following examples using two-scattering-detector arrangement, and one transmission/two-scattering-detector arrangement.

Two-Scattering-Detector Arrangement

Considering the two scattering detectors, at points A and B in FIG. 2, the detector-response $S_{A,1}$ at incident energy band $E_1$ and scattering energy $E'_{A,1}$ equation (2) can be written as:

$$S_{A,1} = k_{A,1} f_{Pi-Pv}(E_1) \rho^e f_{Pv-Pa}(E'_1) \tag{7}$$

where $k_{A,1}$ is a system constant, $f_{Pi-Pv}(E_1)$ and $f_{Pv-Pa}(E'_1)$ are the incident and scattering attenuation factors, respectively, all specific for detector A and incident photon energy $E_1$. The incident attenuation factor then can be written as $$f_{Pi-Pv}(E_1) = exp[-\int_{Pi}^{Pv} \mu_t(r,E_1)dr] \tag{8}$$

By substituting equation (6) into the above equation, the incident attenuation factor becomes $$f_{Pi-Pv}(E_1) = exp[-\int_{Pi}^{Pv} \rho^e(r)\sigma(E_1)dr] \tag{9}$$

Since $\sigma(E_1)$ is a not a function of the material present at location r along $P_i$–$P_v$, therefore it can be taken out from the integral, leading to $$f_{Pi-Pv}(E_1) = exp[\sigma(E_1)(-\int_{Pi}^{Pv}\rho^e(r)dr)] \tag{10}$$

In order to simplify the above equation, a material-dependent parameter $a_I$, is defined as follows $$a_I = -\int_{Pi}^{Pv} \rho^e(r)dr \tag{11}$$

By substituting this equation into Equation (10), the incident attenuation factor $f_{Pi-Pv}(E_1)$ can be written as $$f_{Pi-Pv}(E_1) = exp[\sigma(E_1)a_1] \tag{12}$$

Analogous to the above, the scattering attenuation factor for this measurement can be derived leading to $$f_{Pv-Pa}(E'_1) = exp[\sigma(E'_{A,1})a_{SA}] \tag{13}$$

with $$a_{SA} = -\int_{Pv}^{Pa} \rho^e(r)dr \tag{14}$$

where $E'_{A,1}$ is the scattering photon energy corresponding to incident photon energy $E_1$ and scattering angle $\theta_1$. The detector-response $S_{A,1}$ can then be obtained by substituting equation (12) and equation (13) into equation (7) leading to $$S_{A,1}=k_{A,1}exp[\sigma(E_1)a_I]\rho^e_v exp[\sigma(E'_{A,1})a_{SA}] \quad (15)$$

Other scattering responses can be derived in the same way as the above resulting in a set of four equations that can be written as follows:

$$S_{A,1}=k_{A,1}exp[\sigma(E_1)a_I]\rho^e_v exp[\sigma(E'_{A,1})a_{SA}]$$
$$S_{A,2}=k_{A,2}exp[\sigma(E_2)a_I]\rho^e_v exp[\sigma(E'_{A,2})a_{SA}] \quad (16)$$
$$S_{B,1}=k_{B,1}exp[\sigma(E_1)a_I]\rho^e_v exp[\sigma(E'_{B,1})a_{SB}]$$
$$S_{B,2}=k_{B,2}exp[\sigma(E_2)a_I]\rho^e_v exp[\sigma(E'_{B,2})a_{SB}]$$

Taking the logarithm of these equations leads to $$\ln(S_{A,1})=\ln(k_{A,1})+\sigma(E_1)a_I+\ln(\rho^e_v)+\sigma(E'_{A,1})a_{SA}$$
$$\ln(S_{A,2})=\ln(k_{A,2})+\sigma(E_2)a_I+\ln(\rho^e_v)+\sigma(E'_{A,2})a_{SA} \quad (17)$$
$$\ln(S_{B,1})=\ln(k_{B,1})+\sigma(E_1)a_I+\ln(\rho^e_v)+\sigma(E'_{B,1})a_{SB}$$
$$\ln(S_{B,2})=\ln(k_{B,2})+\sigma(E_2)a_I+\ln(\rho^e_v)+\sigma(E'_{B,2})a_{SB}$$

The result is a set of linear equations, consisting of four equations with four unknowns ($\rho^e_v$, $a_I$, $a_{SA}$, and $a_{SB}$), that can be solved simultaneously. Placing the four unknowns on the left side yields $$\ln(\rho^e_v)+\sigma(E_1)a_I+\sigma(E'_{A,1})a_{SA}=\ln(S_{A,1})-\ln(k_{A,1})$$
$$\ln(\rho^e_v)+\sigma(E_2)a_I+\sigma(E'_{A,2})a_{SA}=\ln(S_{A,2})-\ln(k_{A,2}) \quad (18)$$
$$\ln(\rho^e_v)+\sigma(E_1)a_I+\sigma(E'_{B,1})a_{SB}=\ln(S_{B,1})-\ln(k_{B,1})$$
$$\ln(\rho^e_v)+\sigma(E_2)a_I+\sigma(E'_{B,2})a_{SB}=\ln(S_{B,1})-\ln(k_{B,1})$$

Figure 4:
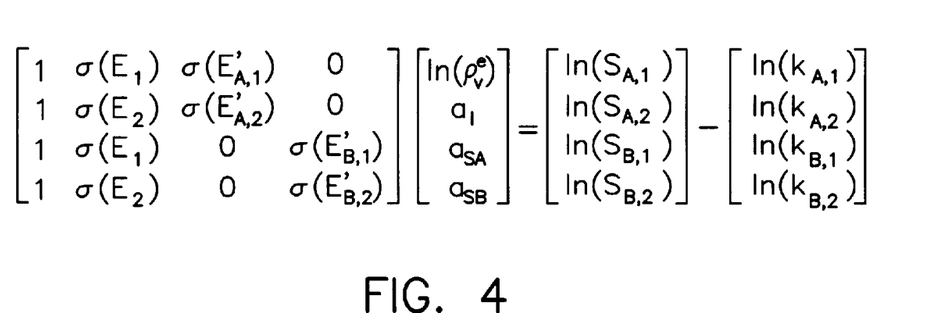
FIG. 4 shows an example of a matrix derived from equation (18) in the preferred algorithm.

The above set of linear equations can be rewritten into a matrix form as shown in FIG. 4, or as follows:

$$[M]\{R\}=\{D\}-\{K\} \quad (19)$$

The elements of the matrix [M] depend on the Compton cross-section per electron at different energies. This makes the matrix [M] independent of the material present along the X-ray beam. The vector {D} is formed by the measured detector-responses, and the vector {K} is system-dependent constant. In order to calculate the electron-density $\rho^e_v$ of the voxel V, direct inversion of the matrix equation can be performed using $$\{R\}=[M]^{-1}(\{D\}-\{K\}) \quad (20)$$

In order to be invertible, the matrix [M] has to be a non-singular matrix. The non-singularity of a matrix can be evaluated by calculating its rank and condition-number. The rank is the dimension of the largest square sub-matrix within the original matrix that has a non-zero eigenvalue. Therefore, it provides an estimate of the number of linearly independent rows or columns of a matrix. The condition-number of a matrix is the ratio of the largest singular value of the matrix to the smallest value and provides an indication of the degree of non-singularity of the matrix. A matrix system is said to be ill-conditioned if the condition-number is too large.

Transmission/Scattering Detectors Arrangement

Considering a transmission detector at point T and scattering detectors at points A and B, as illustrated in FIG. 2, the transmission response $T_1$ at incident energy $E_1$ is defined as $$T_1=k_{T,1}f_{Pi-Pv}(E_1)f_{Pv-Pt}(E_1) \quad (21)$$

where $k_{T,1}$ is system constant for transmission measurement at incident energy $E_1$, which can be written as $$k_{T,1}=S_{0,1}(1/R^2)\eta(E_1) \quad (22)$$

where $S_{0,1}$ is the source strength per unit area at energy $E_1$, R is the distance from the point $P_v$ to the detector, and $\eta(E_1)$ is the detector efficiency at energy $E_1$. The incident attenuation factor $f_{pi-pv}(E_1)$ is the same as that for the scattering measurement derived in the previous section and formulated in equation (12). The attenuation factor for the beam between the point $P_v$ and the transmission detector at point T is as follows:

$$f_{pv-pt}(E_1)=exp[\sigma(E_1)a_T] \quad (23)$$

with $$a_T=-\int_{P_v}^{Pt}\rho^e(r)dr \quad (24)$$

By substituting equation (12) and equation (23) into equation (21), the transmission detector response $T_1$ can be obtained.

$$T_1=k_{T,1}exp[\sigma(E_1)a_I]exp[\sigma(E_1)a_T] \quad (25)$$

Similarly, the transmission detector response for incident energy $E_2$ can be expressed as $$T_2=k_{T,2}exp[\sigma(E_2)a_I]exp[\sigma(E_2)a_T] \quad (26)$$

The scattering detector responses $S_{A,1}$ and $S_{A,2}$ are the same as those for the two-scattering-detector arrangement expressed in equation (16). Adding one transmission measurement with incident energy $E_1$, to the scattering measurements at both energy levels will lead to the following five equations comprising five unknowns, and which can be solved simultaneously as previously explained to define the electron-density $\rho^e_v$ at the voxel V.

$$T_1=k_{T,1}exp[\sigma(E_1)a_I]exp[\sigma(E_1)a_T]$$
$$S_{A,1}=k_{A,1}exp[\sigma(E_1)a_I]\rho^e_v exp[\sigma(E'_{A,1})a_{SA}]$$
$$S_{A,2}=k_{A,2}exp[\sigma(E_2)a_I]\rho^e_v exp[\sigma(E'_{A,2})a_{SA}] \quad (27)$$
$$S_{B,1}=k_{B,1}exp[\sigma(E_1)a_I]\rho^e_v exp[\sigma(E'_{B,1})a_{SB}]$$
$$S_{B,2}=k_{B,2}exp[\sigma(E_2)a_I]\rho^e_v exp[\sigma(E'_{B,2})a_{SB}]$$

Energy and Angle Selection

In order to minimize the propagation of uncertainties during the inversion process, the condition-number of matrix [M] has to be kept as small as possible. The value of the condition-number depends on $\sigma(E_1)$, $\sigma(E_2)$, $\sigma(E'_{A,1})$, $\sigma(E'_{A,2})$, $\sigma(E'_{B,1})$, and $\sigma(E'_{B,2})$, which in turn depend on the incident energy bands ($E_1$ and $E_2$) and scattering energy bands ($E'_{A,1}$, $E'_{A,2}$, $E'_{B,1}$, and $E'_{B,2}$). The latter are affected by the scattering angles ($\theta_A$ and $\theta_B$), in accordance to equation (1). It has been found that in order for the matrix [M] to have a small condition-number, both source energy bands ($E_1$ and $E_2$) have to be far apart. Then, both scattering angles ($\theta_A$ and $\theta_B$) can be flexibly chosen provided their values are not too close to each other. For example, a detector arrangement to measure scattered radiation at 15, 90 and 165 degrees, provides a smaller condition-number than an arrangement at 30, 90 and 150 degrees. However, another consideration has to be taken into account, that is, all photon energies have to be maintained within the Compton scattering dominant range in order to satisfy the approximation in equation (6). If the incident energy is too low, the energy of the scattered photons may fall out of the range within which Compton scattering is dominant, leading to higher error, since the contribution of photoelectric effect in the attenuation coefficient would no longer be negligible. Referring back to FIG. 3, the energy bands should not be selected near the typical intensity peak $E_{PK}$ of a X-ray source, as the energy at this point is normally relatively low, the photon absorption is high and photon scattering is low. Good results were obtained when the two energy bands had a similar band width and were separated by a distance similar to that band width. Although good results were obtained during experimental work with two energy bands having similar band widths spaced apart a specific distance, it is believed that these characteristics are not essential to the successful practicing of the present invention. It is believed that good results can also be obtained with energy bands having different band widths. It is also believed that good results can be obtained with energy bands that are spaced apart various distances, as long as these energy bands do not overlap each other along the source energy spectrum.

Experimental Work

Experimental work was carried out to obtain detector responses of the photons scattered by test objects at various angles and to determine density at points within the objects. The experimental setup consisted of a X-ray source, test objects, detectors, and collimators arranged in some specific configurations described as follows.

Figure 5:
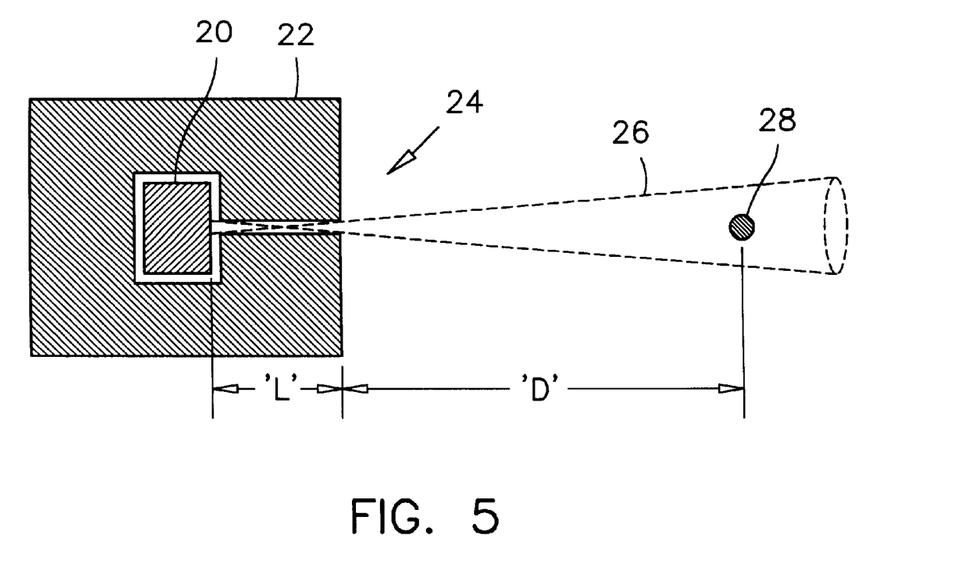
FIG. 5 illustrates the X-ray collimated source used in the experimental work.

A X-ray machine 20 (Pantak MXR 420/25), operated at 400 kV and 3 mA, was used in this experimental work. This machine 20 was sufficiently shielded using lead blocks 22 to protect individuals in the vicinity of the machine from the radiation generated by it. The shielding 22 had a hole 24 with dimensions of 5 mm in diameter and 26 cm in length 'L'. The X-ray beam 26, emanating from a 4 mm focal spot of the X-ray machine 20, had a cone shape exposing the test object 28, as illustrated in FIG. 5.

The test objects 28 investigated in this experiment were solid rods, 6.35 mm in diameter, made of various materials having different mass densities. The test rods were arranged in various fashions as shown in FIGS. 7–11. The materials used are listed in Table 1 below along with their mass densities ($\rho$) and relative electron densities with respect to water ($\rho_r$). Each test object was positioned at a distance 'D' from the outer edge of the source collimator 24, in the center of the X-ray beam 26.

TABLE 1

| Material | Mass Density, $\rho$ (kg/m$^3$) | Relative Electron Density, $\rho_r$ |
|---|---|---|
| Wood | 560 | 0.534 |
| Lucite | 1180 | 1.156 |
| Aluminum | 2700 | 2.364 |
| Steel | 7850 | 6.583 |
| Brass | 8470 | 6.976 |

Figure 6:
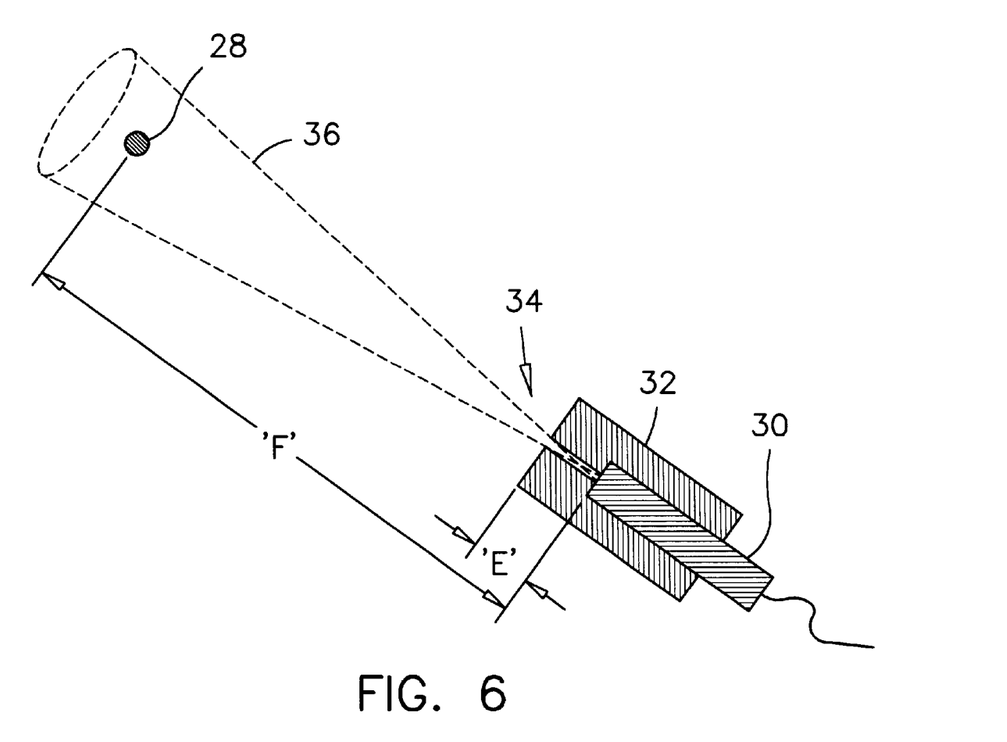
FIG. 6 illustrates a typical collimated detector arrangement used in the experimental work.

The method according to the present invention for measuring the density at a point within an object requires detector responses at two different energy bands for each detector used. Therefore, the detector must be able to count photons within certain energies. Moreover, the scattered photons emerge into the detector from the test object at specific energies depending on the scattering angle. Therefore detectors with energy discrimination capabilities were chosen for the experimental work. The detectors used were CsI(Tl) scintillation detectors because these detectors are able to provide responses as a function of energy. These detectors 30, as illustrated in FIG. 6, were shielded and collimated to focus on the test object. Therefore, only photons scattered from the test object were measured. The collimator 32 was made of lead with a small hole 34 having dimensions of 2 mm in diameter and 24 mm in length 'E', creating a cone-shaped detector view 36. The test object 28 was positioned at a distance 'F' of 25 cm from the detectors 30, with its center aligned at the center of the detectors' fields-of-view 36. The detectors 30 were then connected to a counting system consisting of amplifiers and a multichannel analyzer (MCA) to record the number of photons detected by the detector for each channel. In order to determine the photon energies and the relationship between the MCA's channel number and the photon energy, each detector was calibrated using isotopic sources producing photons with known energies.

Energy Bands

Photons energies were grouped into two bands within the source energy spectrum. Considering that the two bands must be very distinct and be kept within the Compton scattering dominant range, as discussed previously, the source photon energies were chosen from 100 keV up to 200 keV as band I and from 300 keV up to 400 keV as band II. The scattered photon bands, however, differ for every scattering angle. These detected energy bands were evaluated using the angle-energy relationship in equation (1), and presented below in Table 2 as follows.

TABLE 2

| Detector | Band I | | Band II | |
|---|---|---|---|---|
| Angle | LL (keV) | UL (keV) | LL (keV) | UL (keV) |
| 30° | 97.4 | 190.0 | 278.1 | 362.0 |
| 45° | 94.6 | 179.4 | 260.0 | 325.4 |
| 60° | 91.1 | 167.3 | 231.9 | 287.5 |
| 90° | 83.6 | 143.7 | 189.0 | 224.4 |
| 120° | 77.3 | 126.0 | 159.5 | 184.0 |
| 135° | 75.0 | 119.9 | 149.8 | 171.2 |
| 150° | 73.3 | 115.6 | 143.2 | 162.6 |

UL = Upper energy level;
LL = Lower energy level

Figure 7:
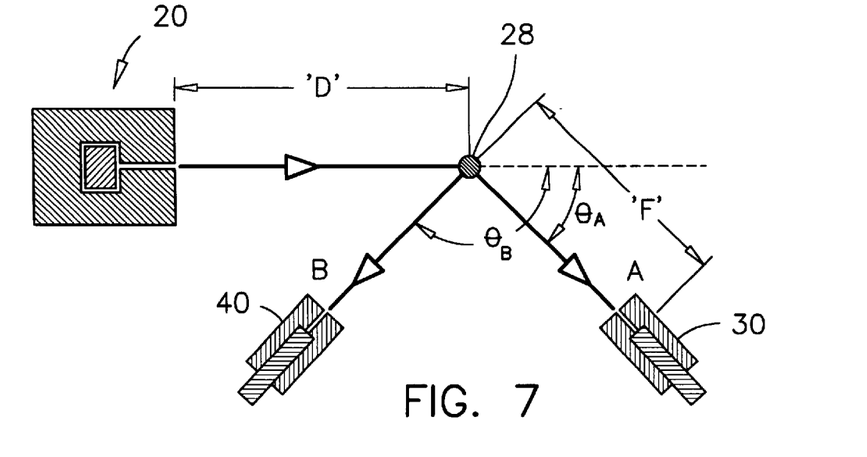
FIG. 7 illustrates a single scatterer setup used in the experimental work.

Experiments were performed for different setups. The first setup consisted of a single scatterer as shown in FIG. 7. The test object 28 was located at the distance 'D' of 25 cm from the X-ray. Two detectors, detector 30 at point 'A' and detector 40 at point 'B', were located at a distance 'F' of 25 cm from the test object 28 at forward and backward scattering angles, respectively. The scattering angles chosen for this experimental work were 30°, 45°, 60°, 90°, 120°, 135°, and 150°. Measurements were carried out simultaneously using the two detectors 30, 40, for scattering angle pairs 30° & 150°, 45° & 135°, and 60° & 120°. In addition, measurements for 90° scattering angle were performed using only detector 30 to provide an over-determined problem.

Figure 8:
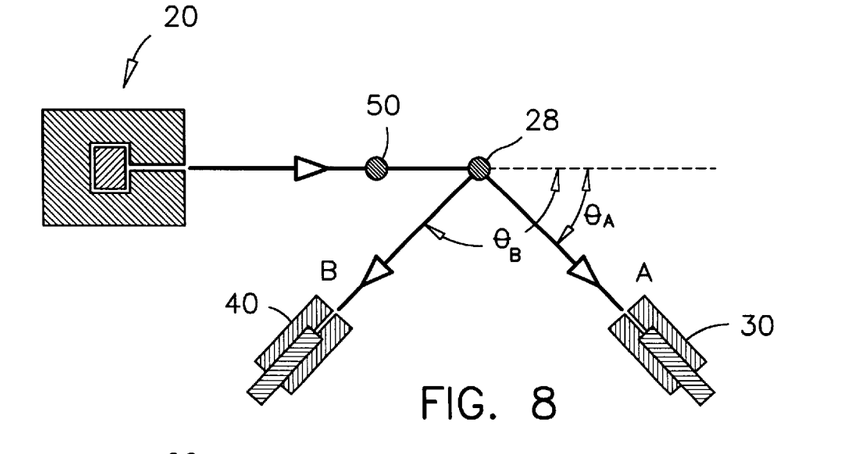
FIG. 8 illustrates a pre-blocked scatterer setup used in the experimental work.

In other experiments, a pre-block scatterer 50 was placed between the X-ray source 20 and the test object 28 as shown in FIG. 8. In other tests, post-block scatterers 60 were placed between the test object 28 and the detectors 30,40, as in FIG. 9. Other measurements were also made for both pre-blocked and post-blocked scatterers as shown in FIG. 10.

Figure 11:
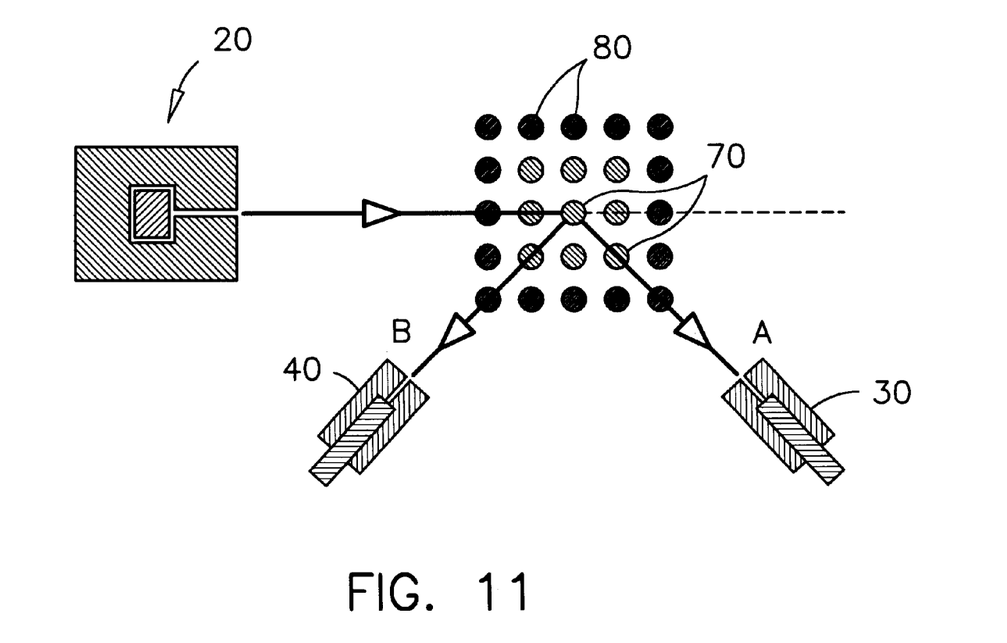
FIG. 11 illustrates a full-test object setup used in the experimental work.

A full test object, which consisted of 25 rods arranged in a 5-by-5 rectangular array was also used in the experiment. Nine target rods 70 made of wood, Lucite, or aluminum with dimension of 6.35 mm in diameter, were enclosed by 16 steel rods 80 of the same size with grid spacing 19.05 mm, as illustrated in FIG. 11. The purpose of this experiment was to demonstrate the ability of the method according to the present invention to determine the density of a test object located within other objects.

During these experiments, a mean-energy approach was used. The mean-energy for each incident and scattered energies were calculated by taking into account the distribution of the photons over energy, $\chi(E)$, using the following equations, $$\bar{E} = \int_{EL}^{EU} \chi(E) E\, dE / \int_{EL}^{EU} \chi(E) dE \quad (28)$$

$$\bar{E}' = \int_{EL}^{EU} \chi(E) E' p(E \rightarrow E') dE / \int_{EL}^{EU} \chi(E) p(E \rightarrow E') dE \quad (29)$$

where $\bar{E}$ designates an equivalent incident energy, $\bar{E}'$ designates an equivalent scattering energy, and $p(E \rightarrow E')$ is the probability of scattering from an incident energy E to scattering energy E'. The limits of the integral in the above equations refer to the upper and lower limits of the energy bands.

During these experiments, each measurement was performed in a 5 minute period.

During these experiments, the attenuation coefficients were averaged over the energy spectrum. The mean Compton scattering cross-sections were formulated as follows:

$$\sigma_{ave} = \int_{EL}^{EU} \chi(E) \sigma E\, dE / \int_{EL}^{EU} \chi(E) dE \quad (30)$$

$$\sigma'_{ave} = \int_{EL}^{EU} \chi(E) \sigma(E' p(E \rightarrow E') dE / \int_{EL}^{EU} \chi(E) p(E \rightarrow E') dE \quad (31)$$

System Constant

Before utilizing the experimental results for calculating the electron density of a material using the method according to the present invention and the preferred matrix inversion process, the system constant needs to be determined. This system constant is preferably determined from an experimental detector responses for a scatterer of known material using the following equation:

$$k_e(E_i, \theta_j) = (S_e(E_i, \theta_j) \rho^e_w)/(f_i \rho^e_s f_s) \quad (32)$$

where $k_e(E_i, \theta_j)$ is the experimental system constant, $S_e(E_i, \theta_j)$ is the detector response measured experimentally at photon energy band $E_i$ and scattering angle $\theta_j$, $\rho^e_v$ and $\rho^e_w$ are the electron densities of the scatterer and water, respectively, $f_i$ and $f_s$ are the incident and scattering attenuation factors, respectively.

The system constant for the experimental work was calculated using wood, Lucite, and aluminum rods as the known scatterers. The system constant is defined as a function of the system configuration excluding the object to be investigated. The system constant is therefore material independent. Consequently, the presence of objects before and/or after the scattering voxel does not affect the system constant. Since the system constant is material independent, the average value for the observed materials for each scattering angle was taken and used in the matrix inversion process.

However, during this experimental work, large differences were found with aluminum scatterers. It is believed that these differences are attributable to a multiple-scattering effect in aluminum. Therefore, in practice, the decision whether some materials would be included in the system constant used in the matrix inversion process would depend on the density range of the material of primary interest. If the material of interest is a light material, the materials used in determining the system constant should be selected from among light materials. On the other hand, if the material of interest is a dense material, reference materials that have high electron density must then be chosen.

Experimental Results with Blocked Scatterers

Figure 9:
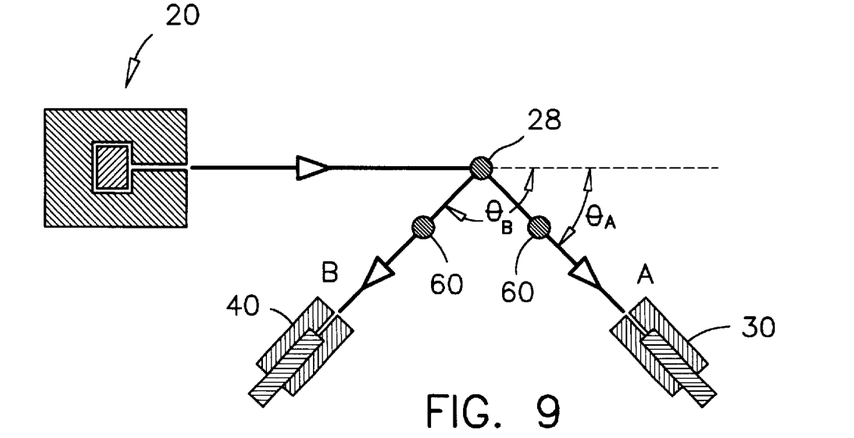
FIG. 9 illustrates a post-blocked scatterer setup used in the experimental work.
Figure 10:
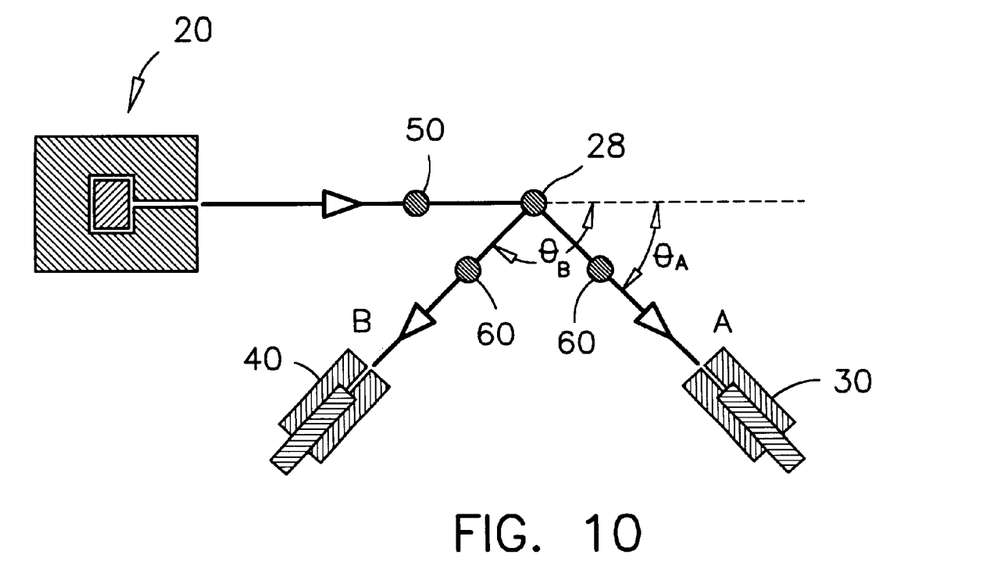
FIG. 10 illustrates a pre-blocked and post-blocked scatterer setup used in the experimental work.

Experiments were carried out and detector responses were obtained for Lucite scatterers pre- and post-blocked by wood, Lucite, and aluminum rods, in setups as illustrated in FIGS. 8–10. The electron-density of the Lucite scatterer, calculated using the average of system constants without aluminum, are given in Table 3, along with the relative difference between the determined and the actual density values. It can be seen that for the fully determined problem calculated using three scattering angle pairs, the differences were generally about or under the 5% level. However, taking the average of the results obtained from the three fully determined problems effectively reduced almost all the differences below 5%. The result of applying the preferred matrix inversion process to all scattering angles successfully reduced all the differences below 5%.

TABLE 3

| | $\rho_r$ determined using detectors at angles: | | | | |
|---|---|---|---|---|---|
| Blockage | 30° & 150° | 45° & 135° | 60° & 120° | average* | all angles** |
| Pre-blocked by wood | 1.184 (2.42%) | 1.106 (−4.35%) | 1.247 (7.81%) | 1.179 (1.96%) | 1.156 (0.00%) |
| Post-blocked by wood | 1.142 (−1.22%) | 1.114 (−3.64%) | 1.060 (−8.36%) | 1.105 (−4.41%) | 1.110 (−4.01%) |
| Pre- & post-blocked by wood | 1.202 (3.94%) | 1.219 (5.44%) | 1.147 (−0.85%) | 1.189 (2.84%) | 1.195 (3.32%) |
| Pre-blocked by Lucite | 1.155 (−0.07%) | 1.146 (−0.86%) | 1.134 (−1.97%) | 1.145 (−0.97%) | 1.149 (−0.61%) |
| Post-blocked by Lucite | 1.127 (−2.50%) | 1.104 (−4.51%) | 1.051 (−9.10%) | 1.094 (−5.37%) | 1.103 (−4.58%) |
| Pre- & post-blocked by Lucite | 1.090 (−5.75%) | 1.160 (0.30%) | 1.212 (4.84%) | 1.154 (−0.20%) | 1.128 (−2.42%) |
| Pre-blocked by aluminum | 1.167 (0.89%) | 1.260 (8.95%) | 1.071 (−7.35%) | 1.166 (0.83%) | 1.188 (2.72%) |
| Post-blocked by aluminum | 1.226 (6.05%) | 1.143 (−1.15%) | 1.206 (4.27%) | 1.192 (3.06%) | 1.207 (4.40%) |
| Pre- & post-blocked by aluminum | 1.201 (3.88%) | 1.109 (−4.11%) | 1.178 (1.92%) | 1.163 (0.57%) | 1.184 (2.40%) |

Experimental Results with a Full Test Object

The preferred matrix inversion process was also applied to the experimental results of the full test object containing wood, Lucite, and aluminum rods. The results of applying the matrix inversion process using Lucite rod as the reference material, presented in Table 4, show results that are very close to the actual density values.

TABLE 4

| Rod material | Electron density | | |
|---|---|---|---|
| | Actual | Determined | Difference |
| Wood | 0.534 | 0.524 | −1.81% |
| Lucite (reference) | 1.156 | 1.156 | 0.00% |
| Aluminum | 2.364 | 1.790 | −24.26% |

Adjustment to the System Constant

However, it was found that the system constants obtained from the equations (32) needs to be adjusted before performing the preferred matrix inversion process, for the reasons discussed as follows.

Figure 12:
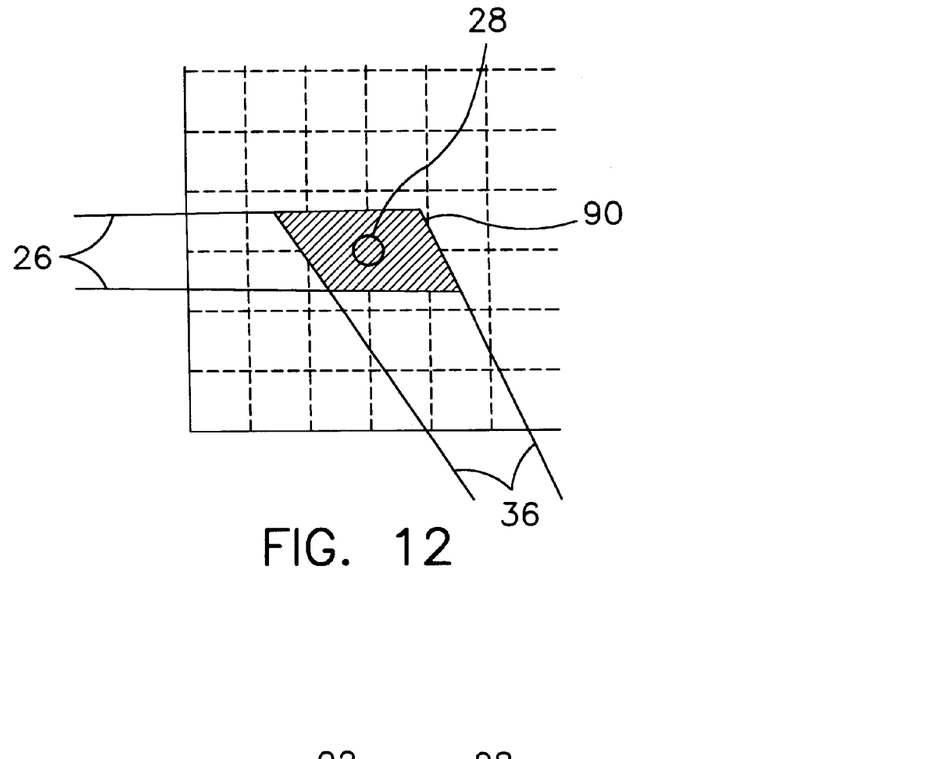
FIG. 12 represents the actual size of a voxel containing a single scatterer.
Figure 13:
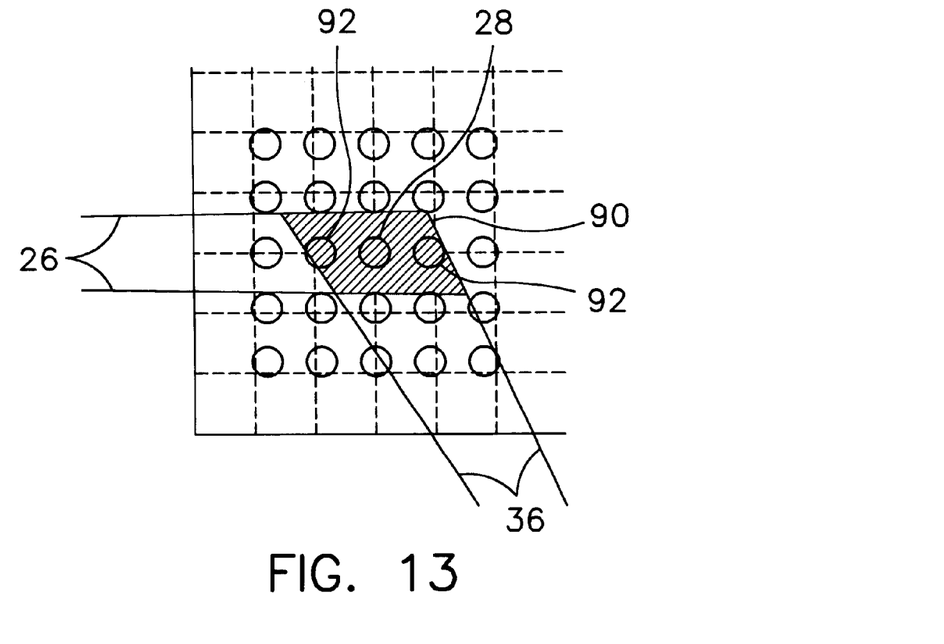
FIG. 13 represents the actual size of a voxel containing several scatterers in a full-test object.

The system constants used for the previously described experimental work for full test object were calculated using a single rod with a specific dimension, i.e. 6.35 mm in diameter. The full test object, on the other hand, consisted of nine rods made of specific material arranged in a square array surrounded by steel rods. Consequently, there was a possibility that the exposed voxel enclosed more than one rod in contrast to only one rod. FIGS. 12 and 13 show the two-dimensional appearance of the rods 28 and the voxel 90 enclosed by the field of view of the incident and scattered radiation beams 26, 36, for both the single scatterer and full test object setup. It can be seen from the illustrations that about three rods were enclosed by the voxel 90 in the full test object setup. However, since the voxel 90 is defined as an intersection between the cone-shaped source beam 26 and the cone-shaped detector view 36, as shown in FIGS. 5 and 6, the length of the rod 28 in the center of the voxel exposed to radiation is bigger than the lengths of the other two rods 92 covered by the voxel 90. It was therefore, required to calculate the actual volume of the rods enclosed by the voxel.

The volumes of the exposed voxel 90, as well as the total volume of the rods exposed to radiations inside the voxel 90, were calculated using a known method for calculating the intersection of two cones for each scattering angle. These volumes were then used to adjust the system constant calculated from single scatterer to be utilized in the full test object setup, using the following relationship:

$$k_{FT} = k_{SS} V_{FT}/V_{SS} \quad (33)$$

where $k_{FT}$ and $k_{SS}$ are the system constants for full test object and single scatterer setup, respectively, $V_{FT}$ and $V_{SS}$ are the volume of the rods enclosed by the voxel for full test object and single scatterer setup, respectively.

It will be appreciated that if the reference object covers the whole volume of the exposed voxel, this adjustment to the system constant is not needed. Similarly, a system constant for a commercial installation of the method according to the present invention may be adjusted in other manners. The entire section entitled "Adjustment to the System Constant" is included herein merely to illustrate the fact that the system constant is somewhat dependent upon the geometry of the system, and the designer of such commercial installation should take this information into consideration.

The adjusted system constants were then used in the preferred matrix inversion process. Relative electron densities of full test objects are presented in Table 5. These results have a fairly small differences compared to the actual electron densities for wood and Lucite rods. The determined electron density of aluminum rods, however, still underestimated the actual values, since the system constants were obtained using wood and Lucite scatterers.

TABLE 5

| Rod material | Electron density | | |
|---|---|---|---|
| | Actual | Determined | Difference |
| Wood | 0.534 | 0.531 | −0.60% |
| Lucite | 1.156 | 1.168 | 0.98% |
| Aluminum | 2.364 | 1.923 | −23.22% |

It was also found from the experimental work that scattering angles below 30° or above 150° did not agree well with the preferred matrix inversion process and thus should not be selected.

While one embodiment of the present invention and a preferred matrix inversion process have been illustrated and described herein above, it will be appreciated by those skilled in the art that alternate methods may be employed without departing from the true spirit and scope of the invention. For example, the described embodiment of the present invention was limited to two source energy bands and two or three detectors to formulate a fully-determined problem. It is believed that fewer high-resolution detectors can also be used for measuring scattered radiation from a plurality of distinct source energy bands to formulate a fully-determined problem. Therefore, the above description and the illustrations should not be construed as limiting the scope of the invention which is defined by the appended claims.

We claim:

1. A method for determining the density at a point within a body, comprising the steps of:

providing a X-ray source;

providing a first and second radiation detectors;

using said X-ray source, passing a X-ray beam through a point within a body; said X-ray beam having an energy spectrum;

selecting a first and second source energy bands within said energy spectrum;

using said first and second radiation detectors, obtaining measurements of Compton scattering from said point within said body from said first and second source energy bands, along a first and second angles from said X-ray beam;

using said measurements of Compton scattering from said point within said body from said first and second source energy bands, along said first and second angles from said X-ray beam, mathematically determining a density of said point within said body.

2. The method as claimed in claim 1, further comprising the step of;

using said measurements of Compton scattering from said point within said body from said first and second source energy bands, along said first and second angles from said X-ray beam, mathematically determining a first radiation attenuation factor between said X-ray source and said point; a second radiation attenuation factor between said point and said first detector, and a third radiation attenuation factor between said point and said second detector.

3. The method as claimed in claim 2, further comprising the steps of:

providing a third radiation detector;

obtaining measurements of radiation transmitted through said point within said body along said X-ray beam from said first and second source energy bands, and said step of using said measurements of Compton scattering from said point within said body from said first and second source energy bands, along said first and second angles from said X-ray beam, mathematically determining a density of said point within said body, comprises the additional step of using said measurements of radiation transmitted through said point within said body along said X-ray beam from said first and second source energy bands.

4. The method as claimed in claim 1, wherein said first and second angles are between 30 and 60 degrees and between 120 and 150 degrees respectively from said X-ray beam.

5. The method as claimed in claim 4, further comprising the steps of:

providing a third radiation detector, obtaining measurements of Compton scattering from said point within said body from said first and second source energy bands, along a right angle from said X-ray beam, and said step of using said measurements of Compton scattering from said point within said body from said first and second source energy bands, along said first and second angles from said X-ray beam, mathematically determining a density of said point within said body, comprises the additional step of using said measurements of Compton scattering from said point within said body from said first and second source energy bands, along a right angle from said X-ray beam.

6. The method as claimed in claim 1, wherein said step of mathematically determining a density of said point within said body, comprises the steps of formulating and simultaneously solving four equations containing four unknowns.

7. The method as claimed in claim 1, further comprising the step of calculating a mean energy for each of said measurements of Compton scatterings from said point within said body from said first and second source energy bands, along said first and second angles respectively.

8. The method as claimed in claim 6, wherein said step of formulating and simultaneously solving four equations with four unknowns comprises the steps of formulating and inverting a square matrix.

9. The method as claimed in claim 1, further comprising the step of selecting said first and second source energy bands where Compton scattering dominates in said energy spectrum.

10. The method as claimed in claim 9, wherein said first and second energy bands do not overlap each other along said source energy spectrum.

11. A method for determining the density at a point within a body, comprising the steps of:

providing a X-ray source;

providing a first and second radiation detectors;

using said X-ray source, passing a X-ray beam through a point within a body; said X-ray beam having a first source energy spectrum;

selecting a first and second source energy bands within said source energy spectrum of said X-ray beam;

using said first radiation detector, obtaining measurement of Compton scattering from said point within said body along a first angle and within a first detected energy spectrum related to said source energy spectrum and said first angle;

selecting a first and second detected energy bands within said first detected energy spectrum; said first and second detected energy bands being related to said first and second source energy bands respectively and said first angle;

using said second radiation detector, obtaining measurement of Compton scattering from said point within said body along a second angle and within a second detected energy spectrum related to said source energy spectrum and said second angle;

selecting a third and fourth detected energy bands within said second detected energy spectrum; said third and fourth energy bands being related to said first and second source energy bands respectively and said second angle;

extracting, from said measurement of Compton scattering from said point within said body along a first angle and within a first detected energy spectrum, measurements of Compton scattering from said point within said body along said first angle and within said first and second detected energy bands;

extracting, from said measurement of Compton scattering from said point within said body along a second angle and within a second detected energy spectrum, measurements of Compton scattering from said point within said body along said second angle and within said third and fourth detected energy bands; and using said measurements of Compton scattering from said point within said body along said first angle, within said first and second detected energy bands; said measurements of Compton scattering from said point within said body along said second angle, within said third and fourth detected energy bands; mathematically determining an attenuation factor of said X-ray beam between said X-ray source and said point; an attenuation factor of Compton scattering between said point and said first detector; an attenuation factor of Compton scattering between said point and said second detector, and a density of said point within said body;

such that a density of said point within said body is determinable by exposing said body to a single X-ray beam.

12. The method as claimed in claim 11, further comprising the steps of:

providing a third radiation detector; and using said third radiation detector, obtaining measurement of Compton scattering from said point within said body along a third angle and within a third detected energy spectrum; said third detected energy spectrum being related to said first source energy spectrum and said third angle, selecting a fifth and sixth detected energy bands from said third detected energy spectrum; said fifth and sixth detected energy bands being related to said first and second source energy bands respectively and to said third angle, and extracting, from said measurement of Compton scattering from said point within said body along a third angle and within a third detected energy spectrum, measurements of Compton scattering within said fifth and sixth detected energy bands, and said step of:
    using said measurements of Compton scattering from said point within said body along said first angle, within said first and second detected energy bands; said measurements of Compton scattering from said point within said body along said second angle, within said third and fourth detected energy bands; mathematically determining an attenuation factor of said X-ray beam between said X-ray source and said point; an attenuation factor of Compton scattering between said point and said first detector; an attenuation factor of Compton scattering between said point and said second detector, and a density of said point within said body;
    comprises the step of using said measurements of Compton scattering from said point within said body along said third angle and within said fifth and sixth detected energy bands.

13. The method as claimed in claim 12, wherein said first and second angles are between 30 and 150 degrees from said X-ray beam.

14. The method as claimed in claim 13, wherein said third angle is a right angle.

15. The method as claimed in claim 11, further comprising the steps of:
    providing a third radiation detector; and
    using said third radiation detector, obtaining measurement of radiation transmitted through said point within said body along said X-ray beam within a third detected energy spectrum; said third detected energy spectrum being related to said source energy spectrum;
    selecting a fifth and sixth detected energy bands from said third detected energy spectrum; said fifth and sixth detected energy bands being related to said first and second source energy bands respectively;
    extracting, from said measurement of radiation transmitted through said point within said body along said X-ray beam within said third detected energy spectrum, measurements of radiation transmitted through said point within said body within said fifth and sixth detected energy bands, and
    said step of:
        using said measurements of Compton scattering from said point within said body along said first angle, within said first and second detected energy bands; said measurements of Compton scattering from said point within said body along said second angle, within said third and fourth detected energy bands; mathematically determining an attenuation factor of said X-ray beam between said X-ray source and said point; an attenuation factor of Compton scattering between said point and said first detector; an attenuation factor of Compton scattering between said point and said second detector, and a density of said point within said body;
        comprises the step of using said measurements of radiation transmitted through said point within said body along said X-ray beam within said fifth and sixth detected energy bands.

16. The method as claimed in claim 11 wherein said source energy spectrum has an extent of about 400 keV, said first source energy band is selected between 100 keV and 200 keV and said second source energy band is selected between about 300 keV and 400 keV.

17. A method for determining a density at a point within an object comprising the following steps;
    obtaining separate measurements of Compton scatterings from a X-ray beam passing through a point within an object from each of two separate source energy bands within a X-ray source energy spectrum of said X-ray beam, from each of two different angles from said X-ray beam, and a unique relationship between said one of said measurements of Compton scatterings, one of said source energy bands and one of said angles;
    formulating a number of density-measurement equations comprising said measurements, said unique relationship and said number of unknowns;
    formulating a square matrix, with said equations;
    inverting said matrix, and
    solving said matrix and determining a density at said point within said object.

18. The method as claimed in claim 17, wherein said measurements of Compton scatterings are obtained with said angles being selected within a range of between 30 degrees and 150 degrees from said X-ray beam.

19. The method as claimed in claim 17, wherein said measurements of Compton scatterings are obtained with said source energy bands being selected with a similar band width, and being spaced apart a distance similar to said band width.

20. The method as claimed in claim 17, wherein said equations further comprise measurements of radiation transmitted from said X-ray beam through said point.

21. A method for determining the density at a point within a body, comprising the steps of:
    passing a X-ray beam having an energy spectrum through a point within a body;
    identifying a plurality of separate source energy bands within said energy spectrum;
    obtaining separate measurements of radiation scattered from said point from each of said source energy bands, from each of different angles from said X-ray beam;
    using said measurements, energies of said source energy bands, and Compton scattering principle, formulating a number of equations containing said number of unknowns comprising a density at said point within said body; and
    solving said equations and determining said density.

* * * * *